A. R. EAST.
COTTON CHOPPER.
APPLICATION FILED APR. 24, 1917.
1,247,246.
Patented Nov. 20, 1917.
2 SHEETS—SHEET 1.
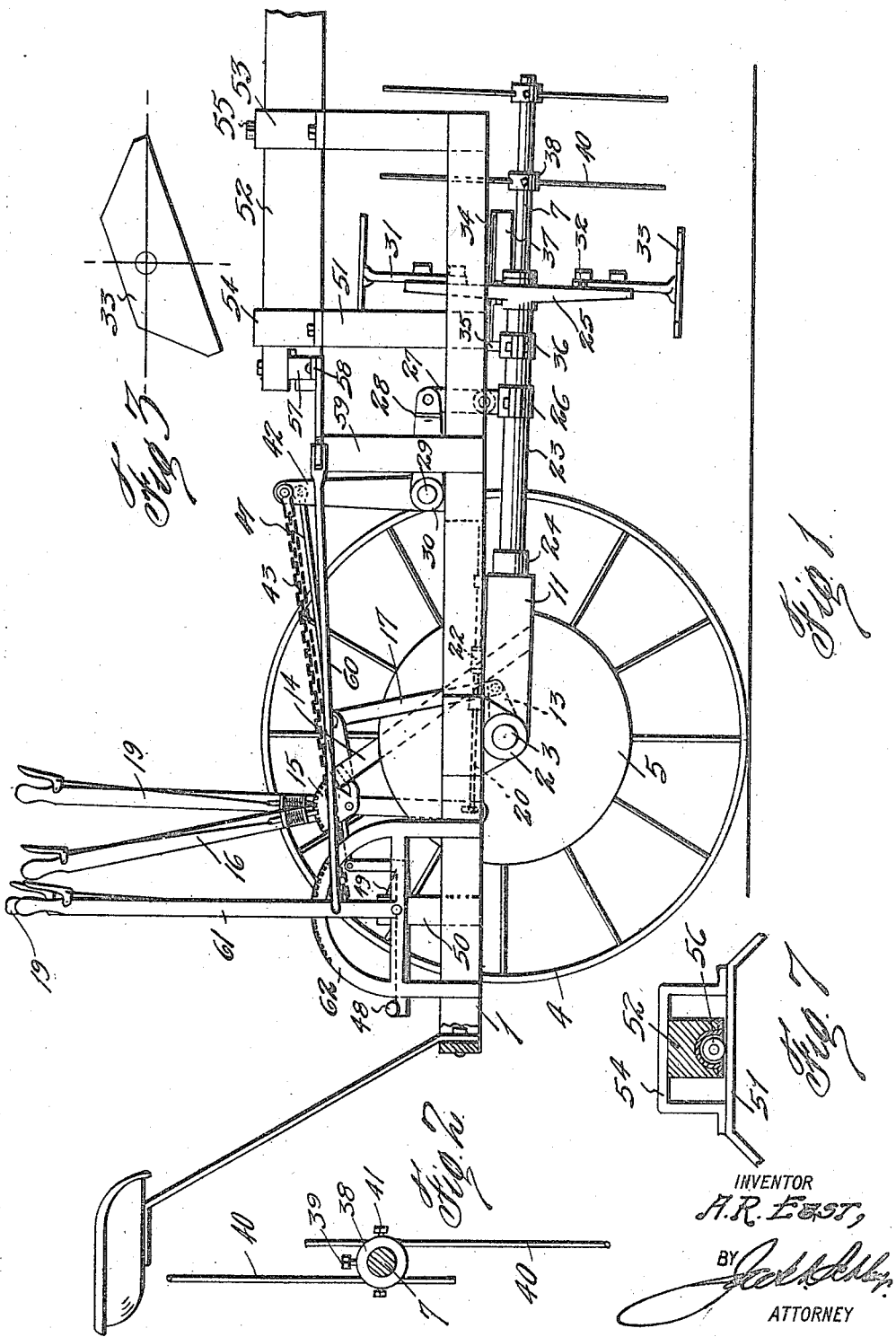
INVENTOR
A. R. East,
BY
ATTORNEY A. R. EAST.
COTTON CHOPPER.
APPLICATION FILED APR. 24, 1917.
1,247,246.
Patented Nov. 20, 1917.
2 SHEETS—SHEET 2.
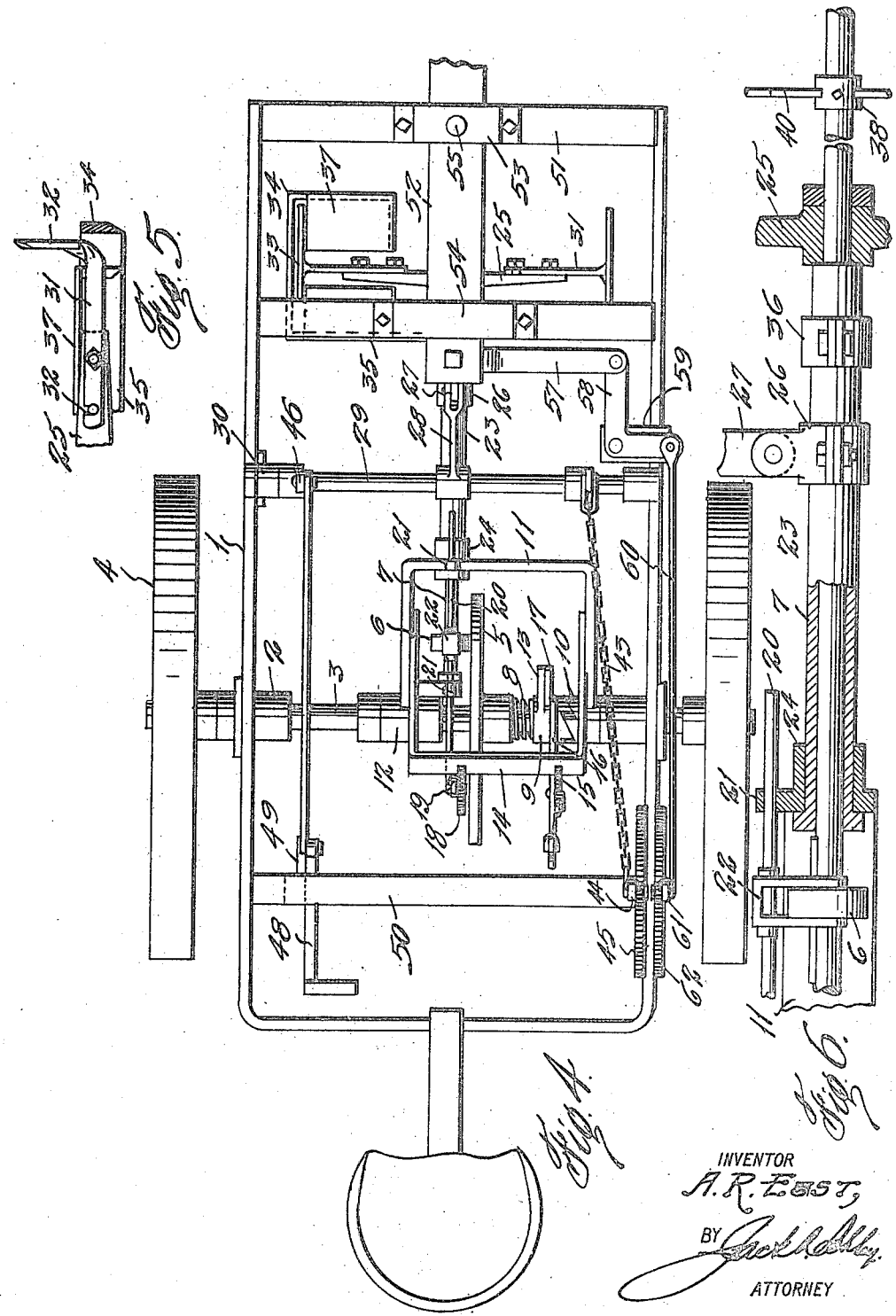
INVENTOR
A. R. East,
BY
ATTORNEY

UNITED STATES PATENT OFFICE.

ARTHUR R. EAST, OF DELIA, TEXAS, ASSIGNOR OF ONE-HALF TO J. J. BECKHAM, OF LIMESTONE COUNTY, TEXAS.

COTTON-CHOPPER.

1,247,246.  Specification of Letters Patent.  Patented Nov. 20, 1917.

Application filed April 24, 1917. Serial No. 164,137.

*To all whom it may concern:*

Be it known that I, ARTHUR R. EAST, citizen of the United States, residing at Delia, in the county of Limestone and State of Texas, have invented certain new and useful Improvements in Cotton-Choppers, of which the following is a specification.

This invention has particular relation to cotton choppers employing revolving hoes.

In carrying out the invention several important and novel features are embodied and include means for cleaning the hoes and keeping down dust; a friction driving mechanism which also includes a yieldable connection which prevents breaking of the hoes if their revolution is interrupted; said friction driving mechanism permitting a change in speed of the revolution of the hoes whereby the cotton may be chopped at intervals of various lengths; an adjustment regulating the depth of the cut of the hoes, an auxiliary hoe lifting device operating without disturbing the adjustment; and tongue adjusting means whereby the machine may be guided.

The invention will be more readily understood from the following specification and by reference to the accompanying drawings, in which an example of the invention is shown and wherein:

Figure 1 is a view of a machine embodying this invention, portions of the machine being omitted and other portions being illustrated in section and in elevation, Fig. 2 is a detail of the trash removing rods, Fig. 3 is a detail of one of the hoes, Fig. 4 is a plan view of the machine, Fig. 5 is a sectional detail of the cleaning device, Fig. 6 is a detail of the shaft-sleeve structure, and Fig. 7 is a detail of the tongue swinging roller.

In the drawings the numeral 1 designates a U-shaped frame having bearing boxes 2 in which an axle 3 is rotatably confined, said axle being mounted in ground wheels 4 in the usual manner. At the central portion of the axle a friction gear disk 5 is keyed to slide laterally into contact with a friction pinion 6 keyed to slide on a hoe-shaft 7. A tension spring 8 is coiled about the axle between the hub of the disk and a tension collar 9 rotatably mounted on the axle and having inclined teeth or lugs meshing with similar teeth of a bearing sleeve 10. The sleeve 10 is fastened to one end of a yoke 11 which has another sleeve 12 at its other end, both of said sleeves being loosely confined on the axle, but held against lateral displacement. An arm 13 projects from the collar 9 by which it may be rocked. By rocking the collar its teeth will ride up those of the sleeve 10, whereby the collar will be displaced longitudinally on the axle and compress the spring 8 which will force the disk into frictional contact with the pinion. In this way the tension may be controlled or the frictional contact broken.

An arch-bracket 14 is fixed on the yoke and inclines upwardly therefrom as is best shown in Fig. 1. A locking segment 15 is mounted on this bracket and has pivoted thereon a bell-crank adjusting lever 16 which has connection from its short leg with the arm 13 by means of a link 17. By means of this hand lever the collar may be rocked. Another locking segment 18 is mounted on this bracket and has a hand lever 19 pivoted thereon intermediate its ends. The lower depending end of said lever has connection with a shifting rod 20 mounted over the hoe shaft 7 in ears 21 on the yoke. This rod carries a shifting-fork 22 straddling the pinion 6. By adjusting the hand lever 19 the pinion may be adjusted radially of the disk 5 and the gear ratio varied.

The hoe shaft 7 extends through a shaft-sleeve 23 illustrated in detail in Fig. 6. One end of the sleeve 23 is confined in a collar 24 on the yoke 11 and the other end abuts the hub of a hoe spider 25. Intermediate the ends of the sleeve a collar 26 is clamped thereon. This collar is suspended by a link 27 depending from the end of an arm mounted on a transverse shaft 29 arranged to rock in bearing boxes 30 mounted on the frame 1. By rocking this shaft the sleeve 23 carrying the hoe shaft, and the yoke are either swung up or down. On the spider 25 hoe-shanks 31 are fastened as shown in detail in Fig. 5, each shank having a notch 32 engaging over the fastening like the break-foot of a cultivator so that the hoe will swing back instead of breaking off the shank. In Fig. 3 is shown the angle at which each hoe is mounted. This causes the hoe to enter and leave the ground gradually, the point of the hoe entering first. The hoe blade 33 is suitably fastened on the shank and blades of various widths to cut gaps of different widths may be used.

In revolving the hoes pass upward through a cleaning device 34 which has a knife edge as shown in Fig. 5. The device is supported by an arm 35 extending from a split collar 36 secured on the sleeve 23 and whereby the device may be adjusted arcuately as desired. Dust plates 37 are mounted on the device and the hoe shanks and spider pass between the same. These plates tend to deflect the dust downward as it is stirred up by the hoes. Soil adhering to the hoes will be dislodged by the device 34 as the hoes revolve. The hoe shaft is extended forward of the spider 25 and a pair of collars 38 are fastened thereon by set screws 39 as shown in detail in Fig. 2. Parallel rods 40 are passed through the collars on opposite sides in opposite directions and held by setscrews 41. These rods are revolved by the hoe shaft and act to sweep trash aside in advance of the hoes and may be adjusted as desired.

By reason of the tension spring 8 the contact between the disk 5 and the pinion 6 is a yieldable one and should the hoes in revolving strike an obstruction which would prevent further revolution of the spider, the spring would permit the disk to yield and slide on the pinion, thus preventing breaking of the parts. By means of the adjusting lever 19 the pinion 6 may be displaced radially of the disk 5 and a wide range of gear ratios had. By revolving the hoes at a comparatively low rate of speed the hoe blades will cut at longer intervals than where the rate of speed is higher and in this way the dimensions of the hills may be controlled.

The chopping mechanism which is supported by the link 27 from the arm 28 may be adjusted vertically at will. For rocking the shaft 29 an arm 42 is adjustably fastened on the shaft. A chain or other flexible connection 43 extends from the upper end of the arm to a hand lever 44 pivoted on a locking segment 45 mounted on the side of the frame 1. By swinging this lever the chopping mechanism is either raised or lowered and may be minutely set so that the hoes will chop at a regular depth. Another arm 46 extends upwardly from the shaft 29 at the other side of the frame. A pitman 47 is pivoted to the upper end of the arm 46 and extends rearward to a bell-crank foot lever 48 pivoted on a bracket 49 projecting from a transverse foot-bar 50. Should it be desired to lift the chopping mechanism where the stand was thin or to carry it over an obstruction the driver merely places his foot on the lever 48 and presses the latter downward, whereby the shaft 29 is rocked and the chopping mechanism lifted. The chain 43 permits this action without disturbing the adjustment of the cutting depth of the hoes.

One of the features of this invention is means for guiding the machine and thus following the row of plants. A pair of spaced arch bars 51 are mounted on the front open end of the frame 1 and support a tongue 52 which is confined in keepers 53 and 54 respectively, fastened on the arch bars. The tongue is pivoted on a bolt 55 passing through the forward keeper 53 and its bar 51. The rear keeper 54 is longer than the other and permits a swinging movement of the rear end tongue of sufficient amplitude for guiding the machine as well as making short turns at the ends of the rows. The tongue carries a bearing roller 56 which rides on the rear arch bar making the tongue easy to swing. The rear end of the tongue projects from the keeper 54 and has pivotal connection with a link 57 which extends laterally to a bell-crank lever 58 mounted on bracket 59 carried by the frame 1 at one side. A pitman 60 extends from the lever, rearward to a hand lever 61 pivoted on a locking segment 62 secured on the frame adjacent the segment 45 as shown in Fig. 4. It will be readily seen that pushing the lever 61 forward the bell-crank lever 58 will be swung so as to move the link 57 to the left, whereby the rear end of the tongue will be swung to the left and forward end to the right. This movement would swing the chopping mechanism to the left and by pulling the lever 61 rearward from the position shown in Fig. 4, the chopping mechanism would be swung to the right.

The foregoing description and illustration clearly express the invention, but it is to be understood that said illustration is merely an exemplification and the invention may be carried out in various other ways.

What I claim, is:

1. In a cotton chopper, the combination of a frame, an axle supporting the frame, ground wheels supporting and revolving the axle, a yoke mounted to swing on the axle, a longitudinal hoe shaft carrying hoe supported in the yoke, a driving disk mounted to slide on the axle and revolved thereby, a pinion slidable on the hoe shaft and engaged by the disk, a tensioning device mounted on the axle and engaging the disk to force it into frictional contact with the pinion, a bracket carried by the yoke, a lever mounted on the bracket and having operative connection with the tensioning device, and an adjusting lever mounted on the bracket and connected with the pinion for moving the latter radially of the disk.

2. In a cotton chopper, the combination of a frame, an axle supporting the frame, ground wheels supporting and revolving the axle, a yoke mounted to swing on the axle, a longitudinal sleeve having one end fixed in the yoke and the other end adjustably supported from the frame, a revolving longitudinal hoe shaft extending through the sleeve, hoes mounted on the forward end of the shaft, a pinion slidable on the inner end of the shaft within the yoke and splined on said shaft, a shifting member slidably supported on the yoke and engaging the pinion, and a lever mounted on the yoke and engaging the shifting member.

In testimony whereof I affix my signature.

ARTHUR R. EAST.